Figure 1:
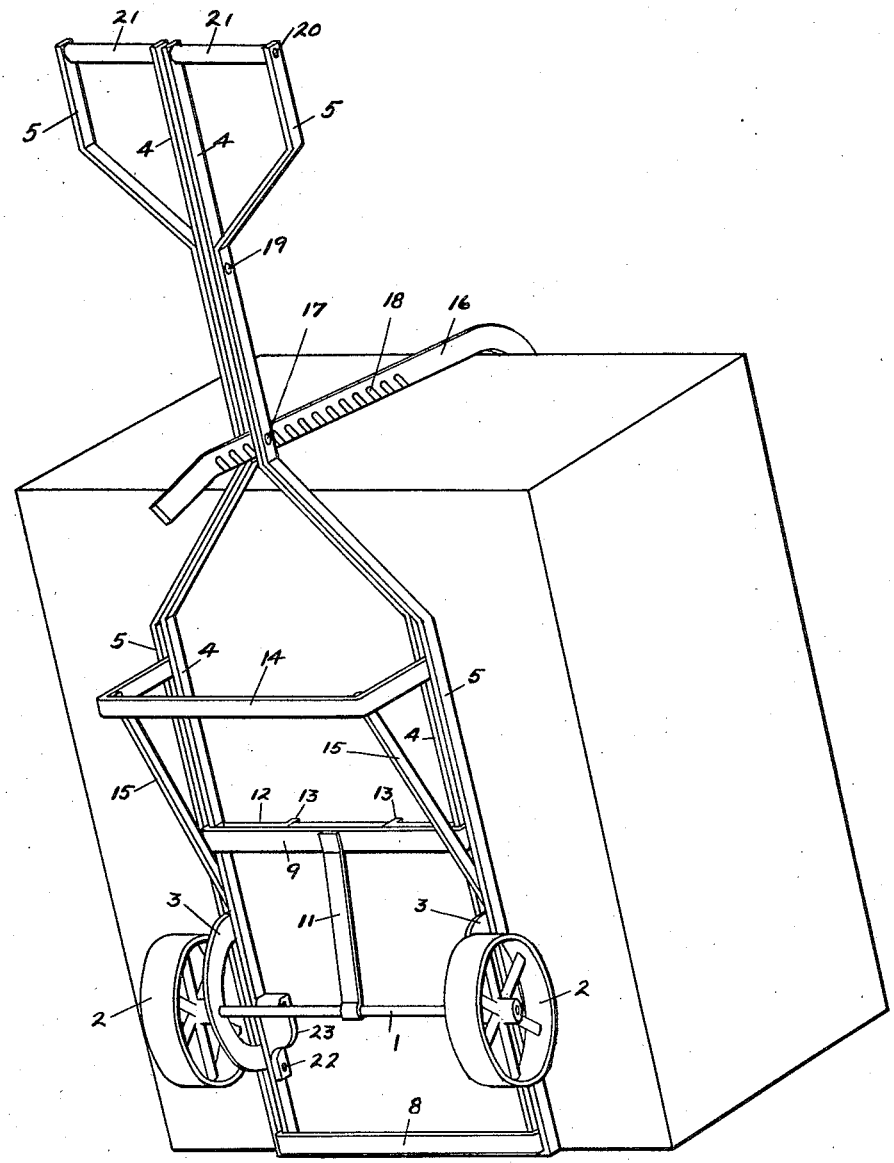

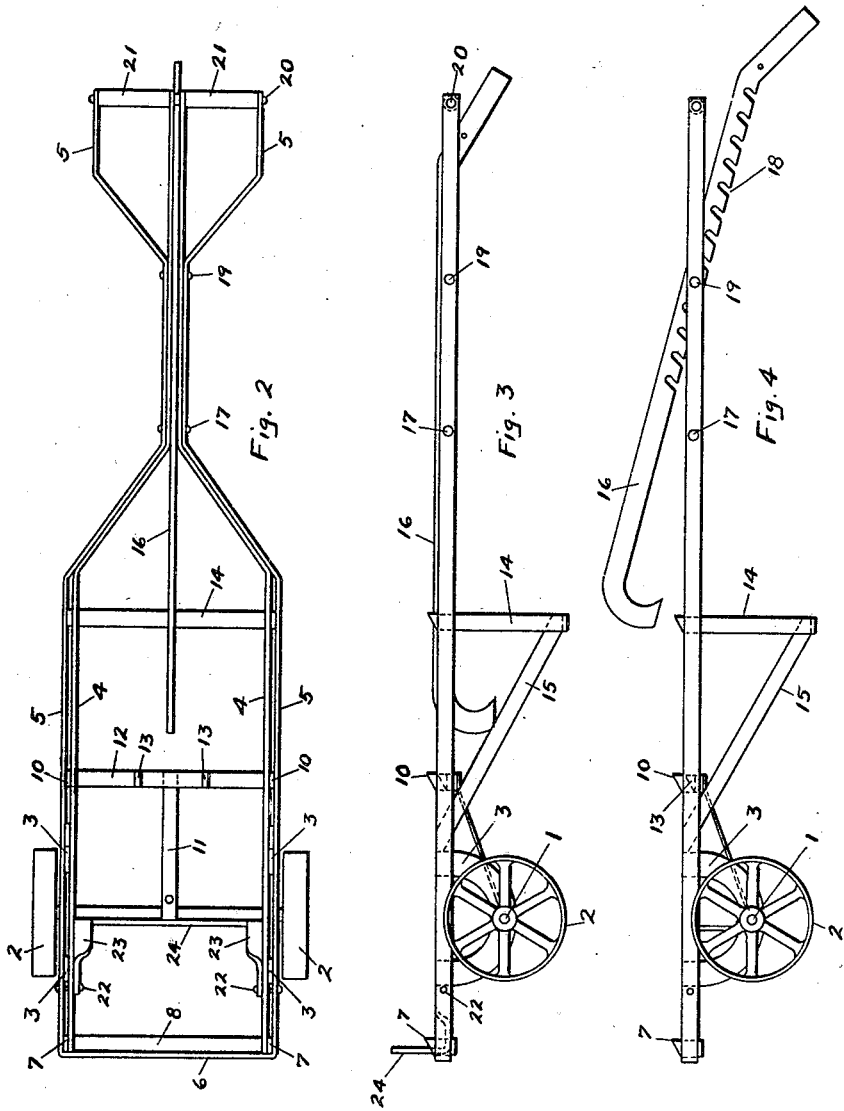

Patented Sept. 26, 1922.

1,429,918

UNITED STATES PATENT OFFICE.

ERHARD ALLEN, OF DAYTON, OHIO, ASSIGNOR TO THE DAYTON DISPLAY FIXTURE COMPANY, OF DAYTON, OHIO, A CORPORATION OF OHIO.

HAND TRUCK.

Application filed January 26, 1921. Serial No. 439,964.

*To all whom it may concern:*

Be it known that I, ERHARD ALLEN, a citizen of the United States, residing at Dayton, in the county of Montgomery and State of Ohio, have invented certain new and useful Improvements in Hand Trucks, of which the following is a specification.

The principal object of my invention is to provide a hand truck that contains readily-adjustable means for handling small and large packages with ease. My improved truck is simple and durable in construction, and efficient in operation.

Other important and incidental objects will be brought out in the following specification, and particularly set forth in the subjoined claims.

In the accompanying drawings, Figure 1 is a perspective view of my improved truck in a position for loading a crate. Figure 2 is a top plan view of the truck. Figure 3 is a side elevational view thereof, with the nose piece in its extended position and the tentacle arm in its out-of-the-way position. And Figure 4 is a side elevational view of said truck, with the nose piece in its out-of-the-way position and the tentacle arm in its upper position for gripping a large package.

Throughout the specification and drawings, similar reference characters denote corresponding parts.

Referring to the accompanying drawings, the numeral 1 designates an axle shaft upon the outer ends of which are loosely mounted two wheels 2, 2. This axle shaft 1 passes through, and is supported by, two semi-elliptical members 3, 3, each one of which has its ends preferably spot-welded between a pair of side bars 4 and 5.

The outer side bars 5, 5 terminate at their lower ends in a cross bar 6, downwardly to which the inner side bars 4, 4 project. Projecting outwardly from between the lower ends of each pair of side bars 4 and 5, is a pointed end 7 of a transverse member 8 that is disposed directly above the cross bar 6, with its pointed ends resting upon the latter and preferably spot-welded between the side bars.

Approximately the same distance above the axle shaft 1 as the transverse member 8 is below it, is a transverse member 9 having pointed ends 10, 10 which project outwardly from between the side bars 4 and 5, similarly to the pointed ends 7, 7 of the transverse bar 8. A brace 11 having a looped lower end to receive the middle portion of the axle shaft 1, projects upwardly for connection to the middle portion of the transverse member 9. Preferably welded to the member 9 between the side bars 4, 4, is a transverse member 12 having outwardly projecting pointed lugs 13, 13 that co-operate with the pointed ends 10, 10 of the transverse member 9 for securing a firm grip upon the upper portion of a package, while the pointed ends 7, 7 of the transverse member 8 engage its lower portion.

A slightly greater distance above the transverse member 9 than the latter is above the axle shaft 1, there are preferably spot-welded between the side bars 4 and 5, the end of a right-angled foot-grip member 14. From the inside corners of the latter, there incline downwardly for a spot-weld connection between the side bars 4 and 5, bracing elements 15, 15, the upper ends thereof being preferably spot-welded to the legs of the foot-grip 14.

From a point just above the ends of the foot grip member 14 the side bars 4 and 5 incline inwardly to a point just wide enough to loosely receive between the inner bars 4, 4, a tentacle arm 16. Just above this point a pin 17 passes through both pairs of side bars, to provide a fulcrum for the tentacle arm 16 when it is desired to load a package of small or medium height on the truck. (See Figure 1.) This tentacle arm 16 has a hook-shaped front end adapted to firmly engage the side of a crate or other package, and notches 18 provided in its under surface, each one of which is adapted to receive the middle portion of the pin 17.

A short distance above the pin 17, a pin 19 passes through both pairs of side bars to provide a fulcrum for the tentacle arm 16 when it is desired to load a tall crate or other package on the truck. (See Figure 4.) Just above the pin 19 the outer side bars 5, 5 incline outwardly and upwardly, terminating in two vertical extremities through which the outer ends of a transverse rod 20 pass. The middle portion of this rod passes through the side bars 4, 4. Surrounding the rod 20 in each wide space between a side bar 4 and its companion side bar 5, is a roller 21 to provide a gripping element for the hand when it is desired to operate the truck.

Hingedly secured to the inside portion of the lower part of each side bar 4, by a pin 22, is a short bracket arm 23 which curves from a plane parallel to the side bar to which it is secured, to a plane at right angles thereto. Secured to the outer right-angled ends of the bracket arms 23, 23 is a nose piece or flange 24 which, when the bracket arms are turned to their lowermost positions, will be brought to the horizontal position shown in Figure 3. When the flange piece 24 is in this position, the truck may be used as any other truck, since the tentacle arm 16 may be brought to the full vertical position between the side bars, as shown in Figure 3. In this position, the tentacle arm is out-of-the-way and is supported by the lower pin 17.

When it is desired to load upon the truck, a heavy crate, barrel or other package, the flange 24 is turned to its upper and out-of-the-way position shown in Figure 2. If the crate to be handled is of medium height, as the one shown in Figure 1, the tentacle arm 16 is thrust through the space between the pins 17 and 19 to bring the hook end of said arm into firm engagement with the top portion of the outer side of the crate. The pin 17 is placed in that recess of the tentacle arm 16 which will give the latter a firm grip on the crate when the truck is brought to a vertical position against the rear side of the crate. With his feet on the member 14, and his hands on the rollers 21, 21, a person can supply sufficient power to pull a crate of great weight upon the truck. Since the tentacle arm 16 grips the top of the crate, the lugs 10 and 13 its middle portion, and the lugs 7 its bottom part, there is no danger of the crate slipping off the truck during the handling operation.

Should it be desired to load a crate of greater height than the one shown in Figure 1, the tentacle arm is brought to a proper position over the pin 19, and the operation just described, repeated.

Having described my invention, I claim:

1. In a device of the type described, the combination with a pair of hand truck wheels, of a pair of side bars whose forward ends are supported upon said wheels, said side bars being bent at an angle inwardly about midway of their length and then rebent parallel with their forward ends, said bars then being bent outwardly at an angle and then rearwardly parallel to their forward ends, and a transverse handle supported by their outer ends.

2. In a device of the type described, the combination with a pair of hand truck wheels, of two pairs of side bars whose forward ends are supported upon said wheels, said side bars being bent toward each other about midway of their length and then rebent parallel to their forward ends, the two outer bars being then bent away from each other at an angle and then rebent parallel to the two inner bars which project outwardly in parallel alinement the same distance, and a handle member connected between the outer ends of each pair of bars.

In testimony whereof I have hereunto set my hand this 22nd day of January, 1921.

ERHARD ALLEN.

Witness:
HOWARD S. SMITH.